(12) United States Patent
Khan et al.

(10) Patent No.: US 10,640,005 B2
(45) Date of Patent: May 5, 2020

(54) BRACKET ATTACHMENT STRUCTURE HAVING AN INTERNAL PLATE

(71) Applicant: Ford Global Technologies, LLC, Dearborn, MI (US)

(72) Inventors: Ahteram Khan, Canton, MI (US); Nicholas Braeseker, Novi, MI (US); Jingmei Shen, Troy, MI (US); Ying Zhao, Canton, MI (US); Afif Sabbagh, Troy, MI (US); Thomas A. Wagner, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 15/705,662

(22) Filed: Sep. 15, 2017

(65) Prior Publication Data

US 2019/0084441 A1 Mar. 21, 2019

(51) Int. Cl.
*B60K 1/04* (2019.01)
*B60L 50/64* (2019.01)

(52) U.S. Cl.
CPC .............. *B60L 50/64* (2019.02); *B60K 1/04* (2013.01); *B60K 2001/0438* (2013.01); *B60Y 2306/01* (2013.01)

(58) Field of Classification Search
CPC ... B60L 50/64; B60K 1/04; B60K 2001/0438; B60Y 2306/01

USPC ....................................................... 180/68.5
See application file for complete search history.

(56) References Cited

U.S. PATENT DOCUMENTS

| 9,027,684 | B2 | 5/2015 | Araki |
| 9,090,025 | B2 | 7/2015 | Safran |
| 9,517,686 | B1* | 12/2016 | Paramasivam ..... H01M 2/1083 |
| 10,005,350 | B1* | 6/2018 | Khan ....................... B60K 1/04 |
| 2017/0084890 | A1 | 3/2017 | Subramanian et al. |

FOREIGN PATENT DOCUMENTS

DE 102015112088 A1 1/2017

* cited by examiner

*Primary Examiner* — John D Walters
(74) *Attorney, Agent, or Firm* — Brooks Kushman P.C.; David Coppiellie

(57) ABSTRACT

A vehicle underbody includes a battery pack surrounded by an enclosure, and a bracket. The bracket has first and second flanges disposed in a parallel arrangement, and includes a plate having a wall configured to, in response to an impact, rupture at a trigger to allow the enclosure to move away from an impact direction and deform the first flange. The wall is disposed at angle relative to the flanges, and defined such that impact energy is absorbed by the wall and first flange. The first flange, during an impact, moves toward the second flange, which maintains attachment to the vehicle underbody to absorb energy.

20 Claims, 3 Drawing Sheets

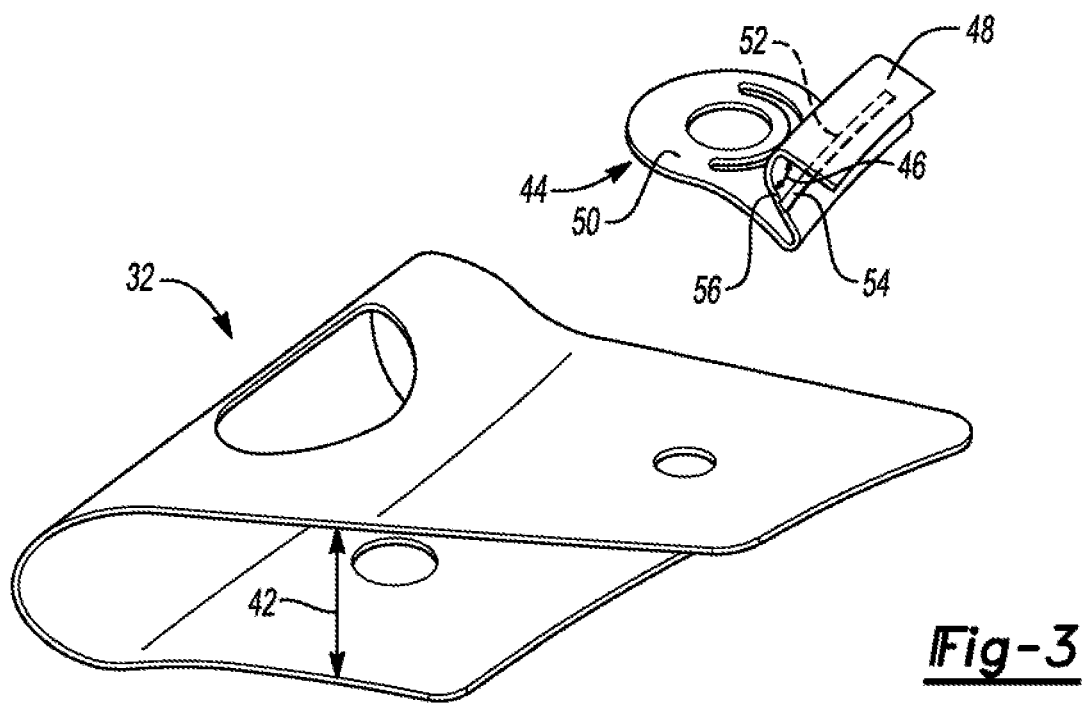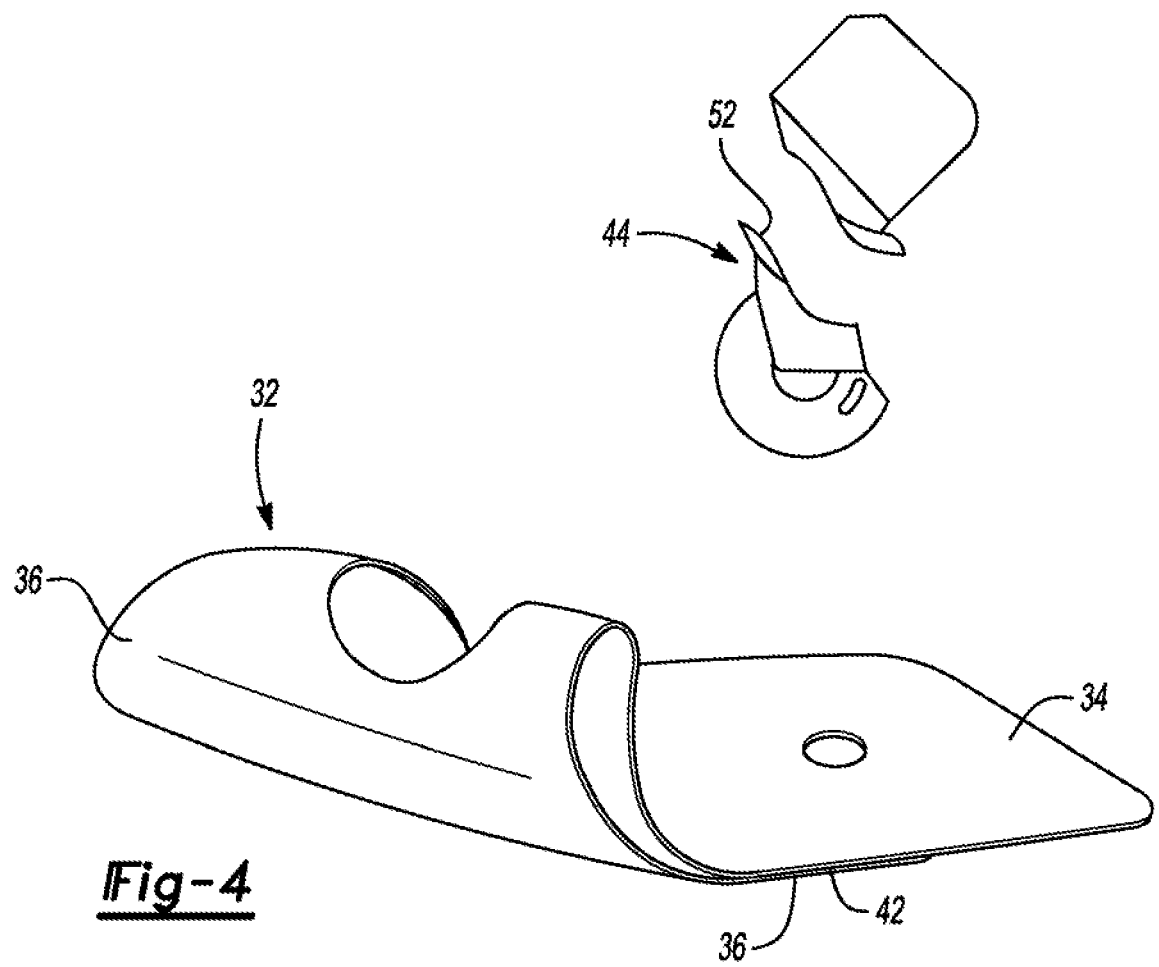

BRACKET ATTACHMENT STRUCTURE HAVING AN INTERNAL PLATE

TECHNICAL FIELD

The present disclosure relates to brackets for enclosures for electric vehicle batteries.

BACKGROUND

Batteries may be used in vehicles to power an electric machine to increase fuel economy. The batteries are attached to a floor of the vehicle using a tray structure. The tray structure includes an enclosure, which uses a bracket to secure the battery to the tray structure within the enclosure. The bracket provides a rigid attachment between the tray structure and battery. The bracket also provides a durable support for the battery during operation of the vehicle.

SUMMARY

A vehicle battery tray structure includes a bracket interconnecting a battery enclosure and a floor. The bracket has first and second parallel flanges interconnected by a side. A plate is disposed at an angle between the flanges. The plate is configured to rupture at a trigger during an impact such that, coupled with deformation of the first flange, the enclosure shifts in a direction away from the impact while the second flange maintains attachment to the floor.

A vehicle underbody includes a battery pack surrounded by an enclosure, and a bracket. The bracket has first and second flanges disposed in a parallel arrangement, and includes a plate having a wall configured to, in response to an impact, rupture at a trigger to allow the enclosure to move away from an impact direction and deform the first flange. The wall is disposed at angle relative to the flanges, and defined such that impact energy is absorbed by the wall and first flange.

A vehicle includes an enclosure surrounding a battery arrangement, and a bracket that attaches the enclosure to a floor. The bracket has a plate disposed at an angle between first and second flanges. The plate includes a wall configured to break at a pre-defined point on the wall during an impact such that the enclosure shifts in a direction away from the impact. The first flange is configured to move toward the second flange during impact, and the second flange is configured to maintain attachment between the enclosure and the floor.

BRIEF DESCRIPTION OF THE DRAWINGS

FIG. 3 is a perspective view of a bracket with a support plate used to attach a battery enclosure to the vehicle.

FIG. 4 is a perspective view of a deformed bracket and ruptured plate of the present disclosure.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
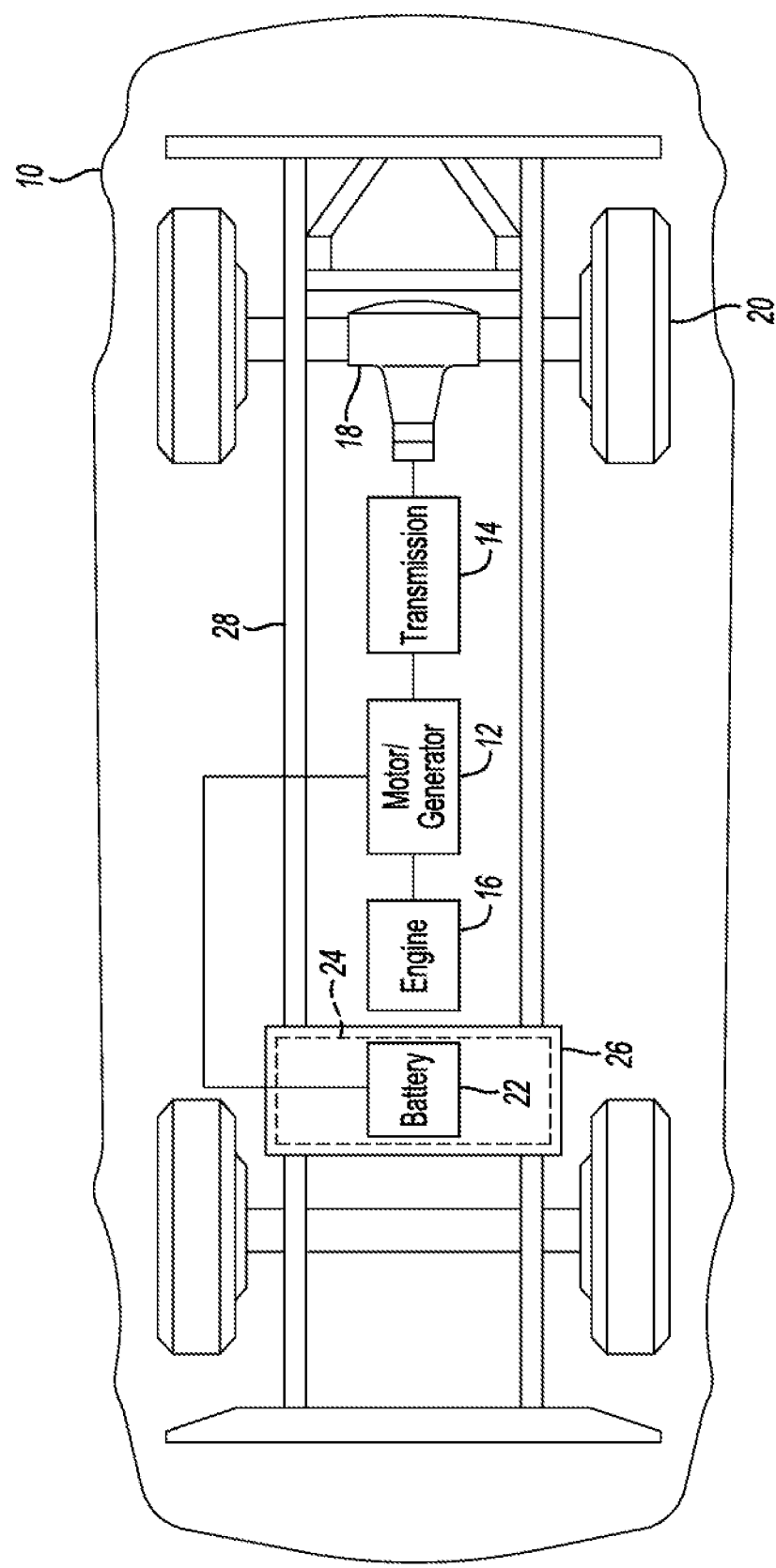
FIG. 1 is a schematic top view of a vehicle.

FIG. 1 depicts a schematic of a typical hybrid-electric vehicle 10. Certain embodiments, however, may also be implemented within the context of plug-in hybrids and fully electric vehicles. The vehicle 10 includes one or more electric machines 12 mechanically connected to a hybrid transmission 14. In at least one embodiment, a single electric machine 12 may be mechanically connected to the hybrid transmission 14. The electric machine 12 may be capable of operating as a motor or a generator. In addition, the hybrid transmission 14 may be mechanically connected to an engine 16. The hybrid transmission 14 may also be mechanically connected to a drive shaft 18 that is mechanically connected to the wheels 20. The electric machine 12 can provide propulsion through the drive shaft 18 to the wheels 20 and deceleration capability when the engine 16 is turned on or off. The electric machine 12 also acts as a generator and can provide fuel economy benefits by recovering energy through regenerative braking. The electric machine 12 reduces pollutant emissions and increases fuel economy by reducing the work load of the engine 16.

A traction battery or battery pack 22 stores energy that can be used by the electric machine 12. The traction battery 22 typically provides a high voltage direct current (DC) output from one or more battery cell arrays, sometimes referred to as battery cell stacks, within the traction battery 22. The battery cell arrays may include one or more battery cells. The traction battery 22 may be supported by an enclosure 24 of a tray structure 26 of the vehicle 10. The tray structure 26 is bolted to an underbody structure 28 of the vehicle 10.

The tray structure 26 may be configured to provide stiffness and durability to the traction battery 22 during normal vehicle operation. For example, during normal vehicle operation, noise, vibration, and harshness may be imposed through the enclosure 24 and tray structure 26 to the traction battery 22. Maintaining integrity of the traction battery 22 allows the electric machine 12 to propel the vehicle 10 over a longer period of travel. This reduces the fuel consumption by the engine 16. Further, in the event of a load applied to the enclosure 24, for example a side impact, energy may be transferred through the enclosure 24 and tray structure 26 to the traction battery 22. The tray structure 26 may need to be designed such that the enclosure 24 maintains durability and stiffness to compensate for noise, vibration, and harshness as well as to absorb energy when a load is applied to the tray structure 26.

Figure 2:
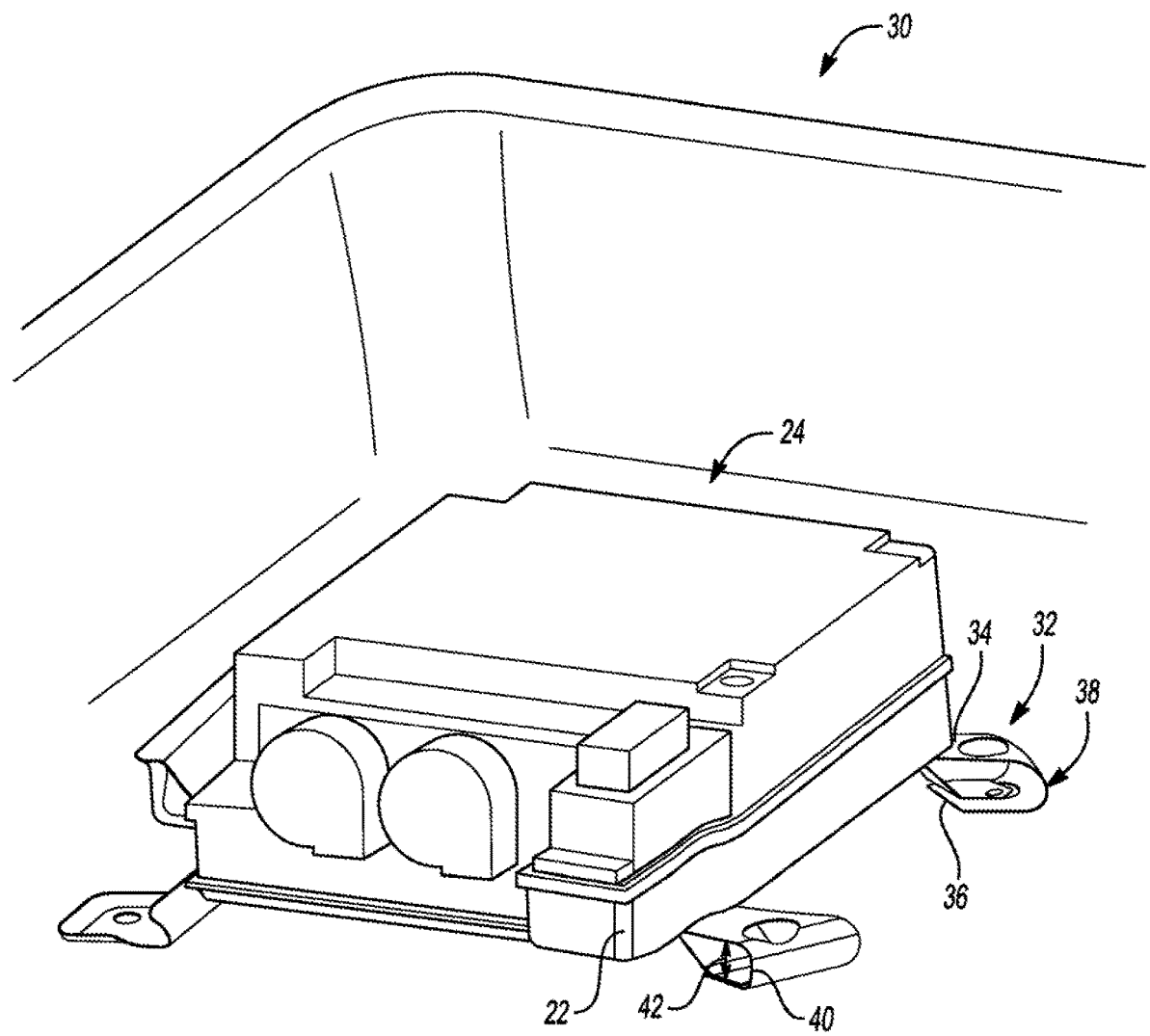
FIG. 2 is a perspective view of a bracket for a hybrid electric vehicle.

FIG. 2 depicts a partial perspective view of the enclosure and tray structure 26 secured to the underbody structure 28 of a rear portion 30 of the vehicle 10. Specifically, FIG. 2 depicts the enclosure 24 secured to the underbody structure 28 using a bracket 32. The bracket 32 secures the tray structure 26 and enclosure 24 to the underbody structure 28 using fasteners (not shown). In at least one other embodiment, the bracket 32 may secure the enclosure 24 or the tray structure 26 to the underbody structure 28 using any mechanical fastening process, such as, but not limited to, welding, forming, or by using screws, adhesives, or rivets, for example. The bracket 32 is formed having first and second parallel flanges 34, 36. As described, the first and second parallel flanges 34, 36 are oriented parallel to each other and connected by a side 38. The side 38 of the bracket 32 defines a general U-shape. In at least one other embodiment, the side 38 may define a generally square shape, ovate shape, or any other profile that interconnects the first and second flanges 34, 36.

The side 38 interconnects the first and second flanges 34, 36 to secure the enclosure 24 to the underbody structure 28. Therefore, the side 38, being generally U-shaped, defines a curvature 40 that separates the first flange 34 from the second flange 36. Stated differently, a curvature 40 of the side 38 of the bracket 32 defines a space 42 between the first flange 34 and the second flange 36. The curvature 40 of the side 38, therefore, allows the bracket 32 to deform under load. The curvature 40 of the side 38 of the bracket 32 provides the space 42 between the first and second flanges 34, 36, which are oriented parallel to each other. The curvature 40, therefore, allows the bracket 32 to absorb energy during impact with the enclosure 24. Specifically, the curvature 40 of the side 38 allows the bracket 32 to move away from an impact. For example, when a load (not shown) impacts the underbody structure 28 and transfers through the underbody structure 28 to the enclosure 24, the bracket 32, via the curvature 40 of the side 38 and the space 42 between the first and second flanges 34, 36, allows the battery pack 22 to shift, or rotate approximately 4°. The bracket 32 allows the battery 22 to shift, or rotate because the space 42 between the first and second flanges 34, 36 and the side 38 form a crumple zone that is configured to absorb energy.

However, the bracket 32 is not configured to rupture when impacted. Stated differently, the bracket 32 only deforms as described, and does not rupture or separate the enclosure 24 from the underbody structure 28. In this way, the bracket 32 may absorb energy by reducing the space 42 between the first and second flanges 34, 36, and deforming the side 38. Using the bracket 32 to crumple and absorb energy, but maintain attachment between the enclosure 24 and the underbody structure 28 ensures that the enclosure 24 does not separate from the underbody structure 28 and is maintained on the vehicle 10. The bracket 32 may be formed from a mild steel with a 30% elongation to provide the deformation without rupture. In at least one other embodiment, the outer bracket 32 may be formed from any other material that provides the required stiffness, deformation, and other structural capabilities without rupturing under a load. Deformation of the bracket 32 will be discussed in more detail with reference to the other Figures.

FIG. 3 depicts an exploded perspective view of the bracket 32 and a plate 44. Specifically, the plate 44 may be disposed between the first and second flanges 34, 36 of the bracket 32. The plate 44 may also be disposed at an angle 46 between the first and second flanges 34, 36. The plate 44 is configured to stiffen the bracket 32. Stiffening the bracket 32 by inserting the plate 44 at the angle 46 allows the bracket 32 to absorb energy as described above. While the bracket 32 may be formed from a lower strength, softer metal that provides energy absorption through deformation, the plate 44 may be formed from a high strength, low alloy steel. The plate 44 reduces noise, vibration, and harshness transferred through the bracket 32 to the enclosure 24.

As depicted in FIG. 3, the plate 44 may be formed as a substantial Z-shape such that the plate 44 includes first and second ends 48, 50 that are in contact and planar with the first and second flanges 34, 36. The first and second ends 48, 50 allow the plate 44 to be interposed between the parallel first and second flanges 34, 36. The first and second ends 48, 50 provide an easy attachment to the first and second flanges 34, 36 of the bracket 32. However, in at least one other embodiment, the plate 44 may be attached between the first and second, flanges 34, 36 using any commonly known attachment mechanisms, such as, but not limited to, adhesives, welding, or by position.

As described above, load energy is absorbed by the bracket 32 through deformation of the first flange 34 and the side 38 of the bracket 32 without rupture. Therefore, the plate 44 may also include a trigger 52. The trigger 52 of the plate 44 allows the plate 44 to rupture such that the first flange 34 and the side 38 may crumple to absorb energy, as described above. The trigger 52 may be defined at any point on the plate 44. For example, the trigger 52 may be a predefined point 54 on a wall 56 the plate 44 configured to direct rupture of the plate 44. Stated differently, the trigger 52 ruptures at a predefined point 54 defined on the wall 56 to further control deformation of the first flange 34 and the side 38 of the bracket 32.

Depicted in FIG. 3, the trigger 52 may be a notch 52 defined in the wall 56 of the plate 44. In at least one other embodiment, the trigger 52 may include a series of perforations, a cutout section, or any other known method to control where the plate 44 will break. The trigger 52 may also be defined on either the first 48 or second 50 ends of the plate 44, as well as the wall 56. Likewise, the plate 44 may be formed from materials configured to rupture under a predefined load similar to a vehicular impact. As stated above, the plate 44 may be disposed at an angle 46 between the first and second flanges 34, 36. Specifically, the wall 56 of the plate 44 may be disposed at the angle 46 between the first and second flanges 34, 36. In this way, the first and second ends 48, 50 of the plate 44 may be parallel to the first and second flanges 34, 36 such that the angle 46 is defined between the wall 56 and the first and second ends 48, 50 of the plate 44. The angle 46 may be based on noise, vibration, and harshness requirements for the vehicle 10, as well as structural support for the bracket 32.

The angle 46 of the plate 44 between the first and second flanges 34, 36 may also be optimized based on load characteristics of an impact, structural requirements of the bracket 32, as well as determination of the trigger 52 on the plate 44 to ensure that the plate 44 ruptures under a given load. Therefore, the angle 46 may change based on vehicle type, size, and/or usage. For example, the angle 46 may need to be greater for larger vehicles than for smaller vehicles. As shown, the plate 44 defines the angle 46 such that the first end 48 of the plate is disposed closer to the first flange 34 than to the side 38 of the bracket 32, and a second end 50 is disposed closer to the side 38 than to the second flange 36. This orientation of the plate 44 allows the plate 44 to rupture and the bracket 32 to deform in the event of an impact, as well as to reduce or eliminate noise, vibration, and harshness transferred to the enclosure 24. In at least one embodiment, the plate 44 will have less than a 20% elongation. Further, the plate 44 may be formed from a different material than the bracket 32.

FIG. 4 specifically depicts deformation of the side 38 and rupture of the plate 44 at the trigger 52. The bracket 32 has been crushed such that the first flange 34 is in contact with the second flange 36, and the space 42 has been eliminated. Again, to deform in this manner allows the bracket 32 to absorb energy with controlled deformation. Further, in order for bracket 32 to absorb energy, the plate 44 ruptures at the trigger 52, described above. When a load is exerted across the underbody structure 28 and is transferred to the enclosure 24, the plate 44 via the trigger 52 determines deformation of the bracket 32. For example, the trigger 52 may be designed such that the plate 44 ruptures if the load is above a predefined value. The predefined value, or threshold is calculated based on the trigger 52. Therefore, orientation and placement of the trigger 52 on the plate 44 determines whether the bracket 32 will crumple and absorb energy.

In this way, the trigger 52 may be optimized between maintaining integrity and stiffness of the bracket 32 to reduce noise, vibration, and harshness, and loads that may cause intrusion into the enclosure 24, which rupture the trigger 52 of the plate 44 causing deformation the bracket 32. In at least one other embodiment, material choice may also be configured to rupture the plate 44 and deform the bracket 32. As stated above, the bracket 32 and the plate 44 may be formed from different materials. For example, the bracket 32 may be formed from a material, which has an elongation based on approximate load exerted by a variety of different impact scenarios. The plate 44, on the other hand, may be formed from the material that provides stiffness based on noise, vibration, and harshness characteristics, but cracks and ruptures under higher loads indicative of a variety of different crash scenarios. In at least one other embodiment, the bracket 32 and the plate 44 may be formed from the same material.

Referring back to FIG. 4, as the bracket 32 deforms and the plate 44 ruptures, the first and second flanges 34, 36 of the bracket 32 maintain attachment to the underbody structure 28 and the enclosure 24. Maintaining attachment between the enclosure 24 and the underbody structure 28 ensures that the battery 22 maintains integrity in the event of an impact. Further, by maintaining attachment between the enclosure 24 and the underbody structure 28 via the bracket 32, the enclosure 24 is prevented from intruding into other areas of the vehicle during an impact. Therefore, the bracket 32 and the plate 44 provide structural integrity to the underbody structure 28 as well as the battery 22 by allowing the battery 22 to shift, or rotate away from the direction of impact by rupturing the plate 44 at the trigger 52 to allow the first flange 34 to crumple to the second flange 36 deforming the side 38 of the bracket, and eliminating the space 42 between the first and second flanges 34, 36.

As stated above, using the bracket 32 in the plate 44 to attach the enclosure 24 and tray structure 26 to the underbody structure 28, and may be adapted for use on a variety of vehicles. Being adaptable, the bracket 32 and the plate 44 may have a wide suitability across an entire fleet of vehicles. Also, the bracket 32 and the plate 44 provide structural integrity between the tray structure 26 and the underbody structure 28 to meet noise, vibration, and harshness criteria. Adding structural integrity between the tray structure 26 in the underbody structure 28 provides a highly durable attachment between tray structure 26 and the underbody structure 28. Lastly, as stated above, the bracket 32 allows the tray structure 26 as well as enclosure 24 to rotate, or shift. Allowing the tray structure 26 and the enclosure 24 to shift, or rotate away from an impact direction reduces intrusion into the battery 22, and improves an abuse tolerance of the battery 22. The bracket 32 and the plate 44, by providing the above advantages, allow a common battery 22 to be used across a variety of different vehicle platforms to improve performance. Use of a common battery 22 provides more possible packaging locations across vehicle platforms, and, therefore, provides cost savings across vehicle fleets.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle battery tray structure comprising:
    a bracket interconnecting a battery enclosure and a floor, having first and second parallel flanges interconnected by a side; and
    a plate disposed at an angle between the flanges, and configured to rupture at a trigger during an impact such that, coupled with deformation of the first flange, the enclosure shifts in a direction away from the impact while the second flange maintains attachment to the floor, wherein the plate includes first and second ends attached to the first and second parallel flanges, respectively, such that a wall interconnects the ends and includes the trigger.

2. The tray structure of claim 1, wherein the trigger is defined by a notch cut into the plate.

3. The tray structure of claim 1, wherein the side defines a curvature such that the first flange of the bracket is configured to deform without rupture.

4. The tray structure of claim 1, wherein the bracket comprises a mild steel and the plate comprises a high-strength, low-alloy steel.

5. The tray structure of claim 1, wherein the plate forms a substantial Z-shape having first and second ends planar to the first and second flanges to attach the plate to the bracket.

6. The tray structure of claim 1, wherein the bracket defines a substantial U-shape formed by the side and the first and second flanges.

7. The tray structure of claim 1, wherein an outer face of the first flange is configured to contact the battery enclosure, and wherein an outer face of the second flange is configured to contact the floor.

8. The tray structure of claim 7, wherein the first end of the plate is in contact and co-planar with an inner face of the first flange, and the second end of the plate in contact and co-planar with the second flange.

9. The tray structure of claim 8, wherein the wall of the plate defines the trigger as a notch therein.

10. The tray structure of claim 9, wherein the notch intersects a side edge of the plate defines a wall extending between the first and second ends.

11. The tray structure of claim 8, wherein the wall defines the trigger as a series of perforations therethrough.

12. The tray structure of claim 1, wherein the side of the bracket defines a cutout therethrough.

13. A vehicle battery tray structure comprising:

a bracket interconnecting a battery enclosure and a floor, having first and second parallel flanges interconnected by a side; and a plate disposed at an angle between the flanges, and configured to rupture at a trigger during an impact such that, coupled with deformation of the first flange, the enclosure shifts in a direction away from the impact while the second flange maintains attachment to the floor, wherein the trigger is defined by a notch cut into the plate.

14. The tray structure of claim 13, wherein the side of the bracket defines a cutout therethrough.

15. The tray structure of claim 13, wherein the bracket comprises a mild steel and the plate comprises a high-strength, low-alloy steel.

16. A vehicle battery tray structure comprising:

a bracket interconnecting a battery enclosure and a floor, having first and second parallel flanges interconnected by a side; and a plate disposed at an angle between the flanges, and configured to rupture at a trigger during an impact such that, coupled with deformation of the first flange, the enclosure shifts in a direction away from the impact while the second flange maintains attachment to the floor, wherein the plate forms a substantial Z-shape having first and second ends planar to the first and second flanges to attach the plate to the bracket.

17. The tray structure of claim 16, wherein the bracket defines a substantial U-shape formed by the side and the first and second flanges.

18. The tray structure of claim 16, wherein the trigger is defined by a notch cut into the plate.

19. The tray structure of claim 16, wherein the trigger is defined as a series of perforations through the plate.

20. The tray structure of claim 16, wherein the side of the bracket defines a cutout therethrough.

* * * * *